United States Patent
Wan et al.

(10) Patent No.: US 11,289,939 B2
(45) Date of Patent: Mar. 29, 2022

(54) POWER SUPPLY APPARATUS AND STANDBY POWER SOURCE FOR CONTROLLER FOR VEHICLE

(71) Applicant: Jing-Jin Electric Technologies Co., Ltd., Beijing (CN)

(72) Inventors: Fuxiang Wan, Beijing (CN); Dongping Gu, Beijing (CN); Shuanglai Dong, Beijing (CN); Gabriel Gallegos, Beijing (CN)

(73) Assignee: JING-JIN ELECTRIC TECHNOLOGIES CO., LTD., Beijing (CN)

(*) Notice: Subject to any disclaimer, the term of this patent is extended or adjusted under 35 U.S.C. 154(b) by 0 days.

(21) Appl. No.: 17/040,024

(22) PCT Filed: Nov. 1, 2018

(86) PCT No.: PCT/CN2018/113378
§ 371 (c)(1),
(2) Date: Sep. 21, 2020

(87) PCT Pub. No.: WO2019/179113
PCT Pub. Date: Sep. 26, 2019

(65) Prior Publication Data
US 2021/0021150 A1 Jan. 21, 2021

(30) Foreign Application Priority Data

Mar. 21, 2018 (CN) .......................... 201810236326.2
Apr. 27, 2018 (CN) .......................... 201810392734.7

(51) Int. Cl.
*B60L 1/00* (2006.01)
*B60L 3/00* (2019.01)
(Continued)

(52) U.S. Cl.
CPC .............. *H02J 9/061* (2013.01); *B60R 16/03* (2013.01); *H02M 3/155* (2013.01)

(58) Field of Classification Search
CPC ......... H02J 9/061; B60R 16/03; H02M 3/155; H02M 1/0064; H02M 1/0032;
(Continued)

(56) References Cited

U.S. PATENT DOCUMENTS

| | | | |
|---|---|---|---|
| 10,166,938 B2* | 1/2019 | Kinoshita | ................. H02J 1/10 |
| 2011/0103103 A1 | 5/2011 | Bell et al. | |
| 2018/0102709 A1* | 4/2018 | Hari | .......................... H02J 7/00 |

FOREIGN PATENT DOCUMENTS

| | | | |
|---|---|---|---|
| CN | 102594124 | * | 7/2012 |
| CN | 102594124 A | | 7/2012 |

(Continued)

OTHER PUBLICATIONS

Rev 00b: "Green-Mode PWM Controller with High-Voltage Start-Up Circuit and Adjustable OLP Delay Time", Nov. 1, 2009 (Nov. 1, 2009), XP055769997, Retrieved from the Internet: URL: https://www.leadtrend.com.tw/archieve/doc/products/sheets/LD7576A-DS-00b.pdf [retrieved on Jan. 28, 2021].

(Continued)

*Primary Examiner* — Richard Tan
(74) *Attorney, Agent, or Firm* — Moser Taboada (57) ABSTRACT

The present disclosure provides an electric-power supplying device, wherein the device includes: an isolation driving unit, including a high-voltage-side winding and a low-voltage-side winding, configured to transform a high-voltage input from a high-voltage power supply into a low-voltage output; a high-voltage inputting unit, including a first switch part that is connected in series to the high-voltage-side winding of the isolation driving unit; an output controlling unit, including a first terminal that is connected (Continued)

to the low-voltage-side winding of the isolation driving unit, a second terminal for receiving an output enabling signal from external, and a third terminal for outputting a low-voltage power-supply electric power when the output enabling signal is high; a switch regulating unit, configured to output a switch regulating signal to the first switch part of the high-voltage inputting unit; a high-voltage starting-up unit, including a first end that is connected to the high-voltage power supply, and a second end that is connected to the switch regulating unit, configured to supply a starting-up voltage to the switch regulating unit; and an auxiliary-power-supply unit, including a first end that is coupled to the low-voltage-side winding of the isolation driving unit, and a second end that is connected to the switch regulating unit, configured to supply an electric power to the switch regulating unit.

15 Claims, 2 Drawing Sheets

(51) Int. Cl.
*H02G 3/00* (2006.01)
*H02J 9/06* (2006.01)
*B60R 16/03* (2006.01)
*H02M 3/155* (2006.01)

(58) Field of Classification Search
CPC .. H02M 1/0009; H02M 3/33523; H02M 1/36; Y02B 70/10; Y02T 10/92

USPC ......................................................... 307/9.1
See application file for complete search history.

(56) References Cited

FOREIGN PATENT DOCUMENTS

| CN | 106026712 A | 10/2016 |
| CN | 106329961 A | 1/2017 |
| CN | 108233721 A | 6/2018 |
| CN | 108336815 A | 7/2018 |
| CN | 208078904 U | 11/2018 |
| EP | 2451067 A2 | 5/2012 |
| JP | 2000134918 A | 5/2000 |
| JP | 2000354375 A | 12/2000 |
| JP | 2013255363 A | 12/2013 |
| JP | 2014003738 A | 1/2014 |
| JP | 2017073433 A | 4/2017 |
| WO | WO-2018043226 A1 | 3/2018 |

OTHER PUBLICATIONS

European Search Report dated Jan. 29, 2021 for application No. EP 18910839.
International Search Report for Application No. PCT/CN2018/113378, dated Feb. 3, 2019.
Okuyama, "Japanese Office Action, (Notice of reasons for refusal)", for JP Application No. 2020-542149 dated Aug. 30, 2021.
Japanese Office Action (with English Translation) for application No. JP 2020-542149 dated Dec. 20, 2021.

* cited by examiner

POWER SUPPLY APPARATUS AND STANDBY POWER SOURCE FOR CONTROLLER FOR VEHICLE

TECHNICAL FIELD

The present disclosure relates to an electric-power supplying device that facilitates the power supply redundancy and the control safety of a controller and a standby power supply of a vehicle controller.

BACKGROUND

In fields such as vehicle power, the controller, as a core component of the power of the entire vehicle, is of vital importance to the controlling safety. The conventional modes of the low-voltage control power supplying to the controllers mostly use the low-voltage battery and the DCDC of the entire vehicle as the power-supply input.

Currently, in the field there are other standby power supplies, for the internal low-voltage control power supplying of the controllers. Because the conventional entire-vehicle systems are complicated, and cannot be made one-hundred-percent safe and reliable, and electric motors and controllers are very important in entire vehicles, currently the market has raised higher requirements on driving safety. In order to make the products more reliable and safer, it is absolutely necessary to add corresponding measures in the controllers, and many vehicle manufactures have already proposed design requirements and indexes that satisfy the functional safety.

SUMMARY

In view of the above, an object of the present disclosure is to provide a design of the power supplying circuit of an standby power supply where the high voltage is transformed into the low voltage for the electric motor controller, to solve the above problem, and to provide a solution which serves as a standby power supply in the controller.

A first aspect of the present disclosure is an electric-power supplying device, wherein the device comprises:

an isolation driving unit, comprising a high-voltage-side winding and a low-voltage-side winding, configured to transform a high-voltage input from a high-voltage power supply into a low-voltage output;

a high-voltage inputting unit, comprising a first switch part that is connected in series to the high-voltage-side winding of the isolation driving unit;

an output controlling unit, comprising a first terminal that is connected to the low-voltage-side winding of the isolation driving unit, a second terminal for receiving an output enabling signal from external, and a third terminal for outputting a low-voltage power-supply electric power when the output enabling signal is high;

a switch regulating unit, configured to output a switch regulating signal to the first switch part of the high-voltage inputting unit;

a high-voltage starting-up unit, comprising a first end that is connected to the high-voltage power supply, and a second end that is connected to the switch regulating unit, configured to supply a starting-up voltage to the switch regulating unit; and an auxiliary-power-supply unit, comprising a first end that is coupled to the low-voltage-side winding of the isolation driving unit, and a second end that is connected to the switch regulating unit, configured to supply an electric power to the switch regulating unit.

In the electric-power supplying device according to the first aspect of the present disclosure, when the low-voltage power supplying has a malfunction, the high-voltage battery can provide the required low-voltage power supply timely via the interior circuit according to the output enabling signal from external. Furthermore, the high-voltage starting-up unit provides the starting-up voltage to the switch regulating unit, and after the switch regulating unit has started to operate, the auxiliary-power-supply unit provides the operating power supply to the switch regulating unit. The auxiliary-power-supply unit is coupled to the low-voltage-side winding of the isolation driving unit, and when the isolation driving unit is transforming the high-voltage power supply to the low-voltage output, an electric current is flowing in the low-voltage-side winding of the isolation driving unit, to supply electricity to the auxiliary-power-supply unit. When the isolation driving unit is not transforming the high-voltage power supply to the low-voltage output, no electric current is flowing in the low-voltage-side winding of the isolation driving unit, and the auxiliary-power-supply unit is not supplied with electricity. Accordingly, the operating state of the switch regulating unit can be controlled according to the output state of the output controlling unit, and when no output enabling signal is received, the switch regulating unit is not provided with the operating electric power, and when the output enabling signal is received, the switch regulating unit is provided with the operating electric power.

The electric-power supplying device of a second aspect of the present disclosure is characterized in that in the electric-power supplying device of the first aspect, the high-voltage inputting unit further comprises:

an absorbing loop, connected in parallel to the high-voltage-side winding of the isolation driving unit; and a sampling element, connected to the switch regulating unit, configured to output a sampled signal; and the switch regulating unit is configured to, based on the sampled signal from the sampling element, output the switch regulating signal to the high-voltage inputting unit.

In the electric-power supplying device according to the second aspect of the present disclosure, noise interference can be reduced by using the absorbing loop, and the voltage of the high-voltage inputting unit can be sampled by using the sampling element, and fed back to the switch regulating unit, which realizes the overcurrent protection and the closed-loop feedback control of the output voltage, to guarantee the stability of the outputted power supply.

The electric-power supplying device of a third aspect of the present disclosure is characterized in that in the electric-power supplying device of the second aspect, the absorbing loop comprises a first resistor, a first capacitor and a first diode, and the first resistor is connected in parallel to the first capacitor, and is connected to a cathode of the first diode;

the first switch part comprises a first MOS transistor, and the first MOS transistor has a source that is connected to the high-voltage-side winding of the isolation driving unit, and a grid that is connected to the switch regulating unit, and is configured to receive the switch regulating signal from the switch regulating unit; and the sampling element comprises a second resistor, and the second resistor is connected to a drain of the first MOS transistor at one end, and connected to a high-voltage-side reference ground at the other end.

In the electric-power supplying device according to the third aspect of the present disclosure, the switch loop of the high-voltage inputting unit is formed by using the first MOS transistor, and the output of the high-voltage inputting unit can be easily controlled by using the switch regulating unit, which can guarantee the stability of the outputted power supply.

The electric-power supplying device of a fourth aspect of the present disclosure is characterized in that in the electric-power supplying device of the first aspect, the output controlling unit comprises:

an output filtering part, connected to the low-voltage-side winding of the isolation driving unit; an outputting part, connected to an output end of the output filtering part, configured to output a low-voltage electric power via a second switch part; and an output-enabling controlling part, configured to, when the output enabling signal is high, cause the second switch part of the outputting part to turn on.

In the electric-power supplying device according to the fourth aspect of the present disclosure, the output filtering part filters the low-voltage electric power outputted by the isolation driving unit, which can guarantee the stability of the outputted power supply. Furthermore, the low-voltage electric power is outputted via the second switch part, whereby the second switch part is turned on when the output enabling signal is high, to output the low-voltage electric power based on the output enabling signal.

The electric-power supplying device of a fifth aspect of the present disclosure is characterized in that in the electric-power supplying device of the fourth aspect, the outputting part of the output controlling unit further comprises: a second diode, comprising an anode that is connected to the output end of the output filtering part, and a cathode that is connected to a source of the second switch part; and a third diode and a third resistor, connected in parallel between the source and a grid of the second switch part, a cathode of the third diode being connected to the source of the second switch part; and the output-enabling controlling part comprises a third switch part, and the third switch part has a grid that is connected to an enabling-signal inputting terminal, a source that is connected to the grid of the second switch part, and a drain that is connected to a low-voltage-side reference ground.

In the electric-power supplying device according to the fifth aspect of the present disclosure, the second diode guarantees that the low-voltage power output is a one-directional power supplying, to prevent the normal power-supply current from flowing back. When the output enabling signal is of a high level, the third switch part is turned on, and at this point, the Vgs of the second switch part is <0, the second switch part is turned on, thereby turning on the outputting part of the output controlling unit, whereby the controller can be powered.

The electric-power supplying device of a sixth aspect of the present disclosure is characterized in that in the electric-power supplying device of the first aspect, the auxiliary-power-supply unit comprises an auxiliary filtering part and a fourth diode, a first end of the auxiliary filtering part is coupled to the low-voltage-side winding of the isolation driving unit, a second end of the auxiliary filtering part is connected to an anode of the fourth diode, and a cathode of the fourth diode is connected to the switch regulating unit.

In the electric-power supplying device according to the sixth aspect of the present disclosure, a power-supply output can be added at the high-voltage input side, which can provide a stable power-supply input to the switch regulating unit after the switch regulating unit has started to operate, to guarantee stable electrical supplying to the switch regulating unit.

The electric-power supplying device of a seventh aspect of the present disclosure is characterized in that in the electric-power supplying device of the sixth aspect, the high-voltage starting-up unit comprises: a third switch part, comprising a source that is connected to the high-voltage power supply via a fourth resistor, a grid that is connected to the high-voltage power supply via a fifth resistor, and a drain that is connected to the switch regulating unit; a first voltage stabilizing part, comprising a cathode that is connected to the grid of the third switch part, and an anode that is connected to a high-voltage-side reference ground; and a charging element, connected to the switch regulating unit at one end, and connected to the anode of the first voltage stabilizing unit at the other end.

In the electric-power supplying device according to the seventh aspect of the present disclosure, when powered on, the first voltage stabilizing part provides a first voltage to the third switch part, the third switch part is turned on, to charge the charging element, the charging element provides the starting-up current and voltage to the switch regulating unit, and when the first voltage, with the increasing of the voltage of the charging element, has descended to 0, the third switch part is cut off. Accordingly, the high-voltage circuit can provide the starting-up voltage and current to the circuit, and it is not required to separately provide an input power supply to the controlling chip. When the high-voltage devices are being used, the operating voltages of the devices should be paid particular attention to. In the configuring of the signal levels, they can be adjusted according to the operating conditions themselves, which has a good applicability.

The electric-power supplying device of an eighth aspect of the present disclosure is characterized in that the electric-power supplying device of the first aspect further comprises:

an isolation-signal unit, comprising a light emitting part and a light receiving part that are coupled; and an output feedback unit, comprising a first end that is connected to the output controlling unit, and a second end that is connected to the light emitting part, configured to cause the light emitting part to emit light corresponding to an output level of the output controlling unit; and the light receiving part is connected to the switch regulating unit, and is configured to convert a received light signal into an electric signal and provide the electric signal to the switch regulating unit.

In the electric-power supplying device according to the eighth aspect of the present disclosure, the isolation-signal unit provides the feedback signal of the output feedback unit to the switch regulating unit, which enables the power supply to be closed-loop controlled, to enable the power-supply output to be more stable and more reliable.

The electric-power supplying device of a ninth aspect of the present disclosure is characterized in that in the electric-power supplying device of the eighth aspect, the output feedback unit comprises: a voltage dividing part, connected to an output end of an output filtering part of the output controlling unit, configured to divide an output voltage of the output filtering part; a second voltage stabilizing part, configured to use an output voltage of the voltage dividing part as a reference voltage; and a voltage regulating part, configured to regulate a cathode voltage of the second voltage stabilizing part.

In the electric-power supplying device according to the ninth aspect of the present disclosure, the voltage dividing part divides the output voltage of the output filtering part, to provide a reference voltage to the second voltage stabilizing part.

The electric-power supplying device of a tenth aspect of the present disclosure is characterized in that in the electric-power supplying device of the eighth aspect, the switch regulating unit comprises:

a regulating part, comprising: a power-supply inputting port, configured to receive a starting-up voltage and an operating electric power that are supplied to the regulating part; a sampling-signal inputting port, configured to receive a sampled signal from the high-voltage inputting unit; a switch-regulating-signal outputting port, configured to output a switch regulating signal to the high-voltage inputting unit; a feedback-signal inputting port, configured to receive a feedback signal from the light receiving part of the isolation-signal unit; and a switch-frequency configuring port and a compensation controlling port;

a switch-frequency configuring part, connected to the switch-frequency configuring port at one end, and connected to a high-voltage-side reference ground at the other end; and a compensation controlling part, connected to the compensation controlling port at one end, and connected to the high-voltage-side reference ground at the other end, configured to perform compensation control on the switch regulating unit; and the light receiving part of the isolation-signal unit is connected to the feedback-signal inputting port of the switch regulating unit.

In the electric-power supplying device according to the tenth aspect of the present disclosure, the regulating part is connected to the power supply via the power-supply inputting port, receives the sampled signal from the high-voltage inputting unit via the sampling-signal inputting port, receives the feedback signal from the output feedback unit via the feedback-signal inputting port, and outputs the switch regulating signal to the high-voltage inputting unit via the switch-regulating-signal outputting port, thereby performing closed-loop control on the high-voltage inputting unit. The switch-frequency configuring part configures the switching frequency of the switch regulating unit, and the compensation controlling part performs compensation control on the switch regulating unit, to guarantee the stability of the outputted power supply.

The electric-power supplying device of an eleventh aspect of the present disclosure is characterized in that in the electric-power supplying device of any one of the third aspect, the seventh aspect and the tenth aspect, the high-voltage-side reference ground is a high-voltage inputting cathode of the high-voltage power supply, and the low-voltage-side reference ground is a low-voltage outputting cathode of a low-voltage outputting end.

In the electric-power supplying device according to the eleventh aspect of the present disclosure, the reference ground at the high-voltage side of the isolation driving unit is the high-voltage inputting cathode of the high-voltage power supply, the reference ground at the low-voltage side of the isolation driving unit is the low-voltage outputting cathode of the low-voltage outputting end, and the high-voltage side is electrically isolated from the low-voltage side.

A twelfth aspect of the present disclosure is an standby power supply of a vehicle controller, wherein the standby power supply comprises the electric-power supplying device of any one of the first aspect to the eleventh aspect, and a controlling end, configured to output the output enabling signal to the electric-power supplying device to guarantee normal power supplying to the controller.

In the standby power supply of a vehicle controller according to the twelfth aspect of the present disclosure, when the low-voltage power supplying of the entire vehicle has malfunctions and the normal power supplying to the controller cannot be guaranteed, the output enabling signal can be outputted to the electric-power supplying device. The electric-power supplying device, in response to the output enabling signal, outputs the standby power supply, to guarantee that the controller will not become out of control due to the malfunction of power supplying.

REFERENCE NUMBERS

100: high-voltage inputting unit; 200: isolation driving unit; 300: output controlling unit; 400: switch regulating unit; 500: high-voltage starting-up unit; 600: auxiliary-power-supply unit; 700: output feedback unit; 800: isolation-signal unit; R1-R18: resistors; C1-C8: capacitors; D1-D7: diodes; Q1, Q2, Q4: MOS transistors; Q3: triode; U1: regulating chip; U2: optical coupler; U3: regulator; T1: transformer; HV+: high-voltage input; HV−: high-voltage-side reference ground; $L_{out}$: low-voltage output; GND: low-voltage-side reference ground; EN_PS: output enabling signal; VIN: power-supply inputting port; DR: switch-regulating-signal outputting port; ISEN: sampling-signal inputting port; FB: feedback-signal inputting port; FA/SD: switch-frequency configuring port; COMP, AGND, PGND: compensation controlling ports.

DETAILED DESCRIPTION

In order to make the objects, the technical solutions and the advantages of the present disclosure clearer, the embodiments of the present disclosure will be described below in further detail in conjunction with the drawings.

The First Embodiment

Figure 1:
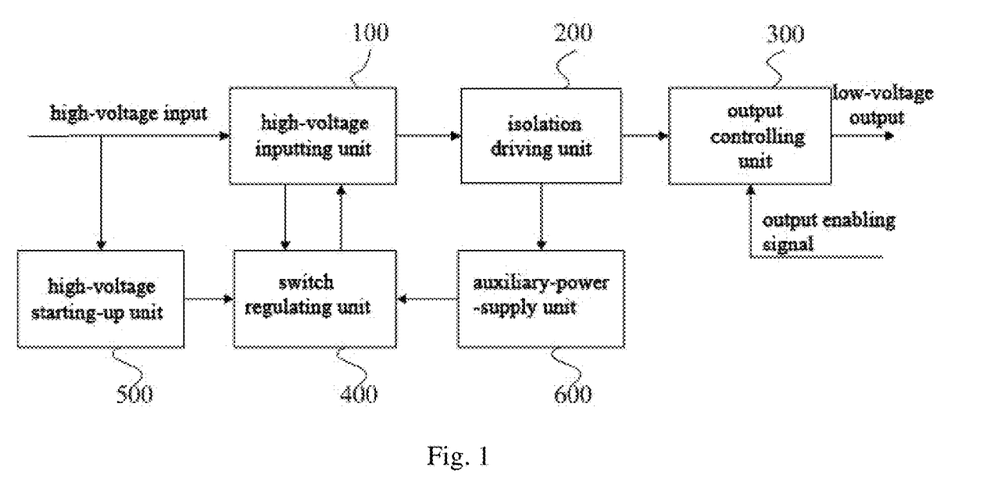
FIG. 1 is a schematic block diagram illustrating the first embodiment of the present disclosure.

FIG. 1 is a schematic block diagram illustrating the first embodiment of the present disclosure. In the first embodiment of the present disclosure, the electric-power supplying device 1 has a high-voltage inputting unit 100, an isolation driving unit 200, an output controlling unit 300, a switch regulating unit 400, a high-voltage starting-up unit 500 and an auxiliary-power-supply unit 600.

Figure 3:
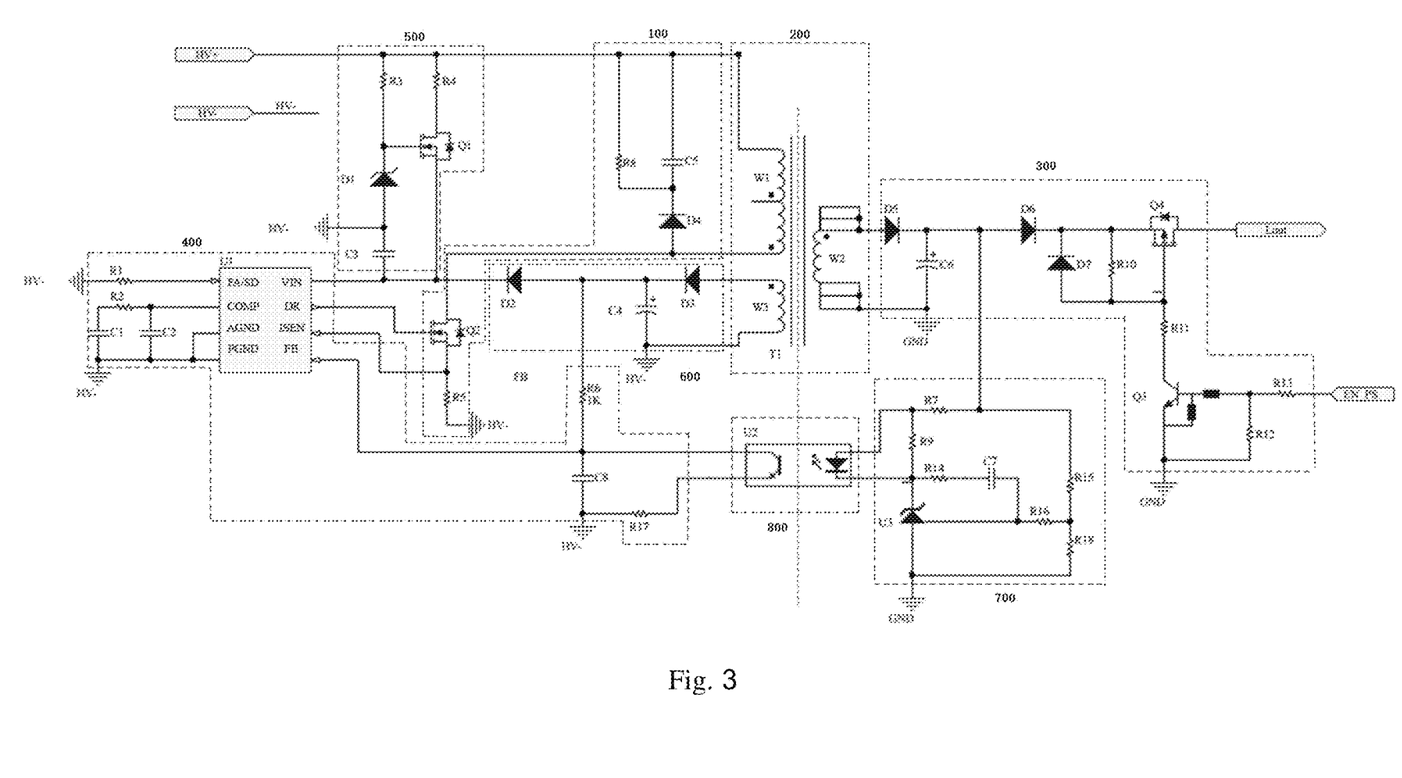
FIG. 3 is a schematic circuit diagram illustrating a particular circuit structure of the present disclosure.

Referring to FIG. 3, the high-voltage inputting unit 100 comprises: an absorbing loop, comprising a resistor R8, a capacitor C5 and a diode D4, the resistor R8 being connected in parallel to the capacitor C5, and being connected to the cathode of the diode D4; a first switch part, comprising an MOS transistor Q2, the MOS transistor Q2 comprising a source that is connected to the high-voltage-side winding W1 of a transformer T1, which is described below, and a grid that is connected to the switch regulating unit, and is configured to receive a switch regulating signal from the switch regulating unit; and a resistor R5, that is connected to the drain of the MOS transistor Q2 at one end, and connected to a high-voltage-side reference ground HV− at the other end.

The isolation driving unit 200 comprises the transformer T1, and the transformer T1 has the high-voltage-side winding W1 (input winding) connected to the high-voltage inputting unit 100, a low-voltage-side winding W2 (output winding) connected to the output controlling unit 300, which is described below, and an auxiliary power supplying winding W3 connected to the auxiliary-power-supply unit 600, which is described below. The high-voltage-side winding W1 is coupled to the low-voltage-side winding W2, and is configured to transform the high voltage from the high-voltage inputting unit 100 into low voltage and output the low voltage to the output controlling unit 300, which is described below. The auxiliary power supplying winding W3 is also coupled to the low-voltage-side winding W2, and is configured to supply an operating electric power to the switch regulating unit 400 via the auxiliary-power-supply unit 600.

The entire power supply operates by flyback power-supply topology, wherein the resistor R8, the capacitor C5 and the diode D4 form a switch absorbing loop of the input winding of the transformer T1, the MOS transistor Q2 is a switch MOS of the input circuit, and the resistor R5 is a current sampling resistor of the input loop, and also provides overcurrent-protection input to the chip U1 of the switch regulating unit 400.

The output controlling unit 300 comprises an output filtering part, an outputting part and an output-enabling controlling part, and is configured to perform filtering and turning-on controlling to the electric power outputted by the low-voltage-side winding W2 of the transformer T1.

The output filtering part has a diode D5 and a capacitor C6, wherein the anode of the diode D5 is connected to the low-voltage-side winding W2 of the transformer T1, the cathode is connected to the anode of the capacitor C6, and the cathode of the capacitor C6 is connected to a low-voltage-side reference ground.

The outputting part has diodes D6, D7, a resistor R10 and an MOS transistor Q4. The anode of the diode D6 is connected to the cathode of the diode D5, and the cathode is connected to the source of the MOS transistor Q4. The grid of the MOS transistor Q4 is connected to the output-enabling controlling part, which is described below, the diode D7 and the resistor R10 are connected in parallel between the grid and the source of the MOS transistor Q4, wherein the cathode of the diode D7 is connected to the source of the MOS transistor Q4. When the output enabling signal EN_PS is high, a triode Q3 is turned on, and at this point, the Vgs of the MOS transistor Q4 is <0, the MOS transistor Q4 is turned on, and the output-power-supply loop is turned on, whereby the controller can be powered. The diode D6 and the MOS transistor Q4 further have the function of controlling the standby power supply to supply power in single phase, to prevent the normal power-supply current from flowing back.

The output-enabling controlling part has the triode Q3 and resistors R11-R13. The grid of the triode Q3 is connected to an enabling-signal inputting terminal via the resistor R13, the source is connected to the grid of the second switch part via the resistor R11, the drain is connected to the low-voltage-side reference ground, and the resistor R12 is connected between the grid and the drain. When the output enabling signal EN_PS received by the grid of the triode Q3 is high, the triode Q3 is turned on, to form a potential difference across the two ends of the resistor R11, thereby providing a turn-on level to the grid of the MOS transistor Q4, to turn on the MOS transistor Q4, to output the low-voltage power supply of the low-voltage-side winding W2 of the transformer T1 as an standby power supply.

The switch regulating unit 400 comprises a regulating chip U1, a switch-frequency configuring part and a compensation controlling part. The regulating chip U1 has a power-supply inputting port VIN, configured to receive the electric power supplied to the regulating chip U1; a sampling-signal inputting port ISEN, connected to the drain of the MOS transistor Q2 of the high-voltage inputting unit 100, configured to receive a sampled signal from the high-voltage inputting unit 100; a switch-regulating-signal outputting port DR, connected to the grid of the MOS transistor Q2 of the high-voltage inputting unit 100, configured to output a switch regulating signal to the high-voltage inputting unit 100; a switch-frequency configuring port FA/SD, connected to a resistor R1, which serves as the switch-frequency configuring part; and compensation controlling ports COMP, AGND, PGND, connected to one end of the compensation controlling part. The circuit structure and the operating principle of the regulating chip U1 are well known, and are not discussed repeatedly here. The resistor R1 in the switch-frequency configuring part is configured to configure the switching frequency of the regulating chip U1. The compensation controlling part is an external compensation control loop, and comprises a resistor R2 and capacitors C1, C2. As shown in FIG. 3, one end of the compensation controlling part is connected to the compensation controlling ports COMP, AGND, PGND, and the other end is connected to the high-voltage-side reference ground.

As shown in FIG. 3, the high-voltage starting-up unit 500 comprises an MOS transistor Q1, resistors R3, R4, a voltage stabilizing diode D1 and a capacitor C3. The source of the MOS transistor Q1 is connected to the high-voltage input HV+ of the high-voltage power supply via the resistor R4, the grid is connected to the high-voltage input HV+ of the high-voltage power supply via the resistor R3, and the drain is connected to the power-supply inputting port VIN of the regulating chip U1. The cathode of the voltage stabilizing diode D1 is connected to the grid of the MOS transistor Q1, and the anode is connected to the high-voltage-side reference ground. One end of the capacitor C3 is connected to the power-supply inputting port VIN of the regulating chip U1, and the other end is connected to the anode of the voltage stabilizing diode D1.

The auxiliary-power-supply unit 600 comprises diodes D2, D3 and a capacitor C4. As shown in FIG. 3, the diode D3 and the capacitor C4 form the auxiliary filtering part, a first end of the auxiliary filtering part is connected to the auxiliary electricity supplying winding W3 of the transformer T1, and configured to filter the auxiliary power supply supplied from the transformer T1. The anode of the diode D2 is connected to the auxiliary filtering part, and the cathode is connected to the power-supply inputting port VIN of the regulating chip U1, to provide to the regulating chip U1 the auxiliary power supply supplied from the transformer T1, and prevent the electric power from the high-voltage starting-up unit 500 from flowing toward the transformer T1.

Here, the high-voltage-side reference ground HV− is the high-voltage inputting cathode of the high-voltage power supply, and the low-voltage-side reference ground GND is the low-voltage outputting cathode of the low-voltage outputting end.

The operation process and the effects of the electric-power supplying device of the first embodiment are described below.

When powered on, the voltage stabilizing diode D1 provides a turn-on voltage Vgs to the grid of the MOS transistor Q1, to cause the MOS transistor Q1 to be turned on, and the high-voltage input HV+ of the high-voltage power supply charges the capacitor C3 via the resistor R4. The capacitor C3 provides to the power-supply inputting port VIN of the regulating chip U1 the transient starting-up current and voltage that are required for starting up. While the voltage of the power-supply inputting port VIN is gradually increasing till the Vgs=0, the MOS transistor Q1 tends, from being turned on, to being completely cut off.

Merely when the output enabling signal is high, the main output loop of the standby power supply is turned on, to start to supply the output of the standby power supply to the controller.

When the regulating chip U1 has been started up, it outputs the turn-on voltage from the switch-regulating-signal outputting port DR to the grid of the MOS transistor Q2, to turn on the MOS transistor Q2, and the high-voltage input HV+ from the high-voltage power supply flows in the high-voltage-side winding W1 of the transformer T1. At this point, the electric current that transforms the high-voltage input HV+ into a low-voltage output $L_{out}$ is flowing in the low-voltage-side winding W2, which is coupled to the high-voltage-side winding W1 of the transformer T1, and the electric current of the low-voltage output $L_{out}$ flows to the source of the MOS transistor Q4 via the output filtering part formed by the diode D5 and the capacitor C6 and the one-directionally turned-on diode D6.

When the low-voltage power supplying of the controller, as the electricity-consuming device, is normal, the main output of the standby power supply is not operating, and is not adding the load of the external low-voltage power supply. At this point, the standby power supply is in the state of a low power consumption.

When the output enabling signal EN_PS received from the external is high, the triode Q3 is turned on, and the turn-on voltage is applied to the grid of the MOS transistor Q4, to turn on the MOS transistor Q4. Accordingly, the main output loop of the standby power supply is turned on, to start to output the $L_{out}$ from the drain of the MOS transistor Q4, as the output of the standby power supply, to supply to the external controller.

When the main output loop of the standby power supply is turned on, the electric current of the low-voltage output $L_{out}$ is flowing in the low-voltage-side winding W2 of the transformer T1, which, along with the auxiliary power supplying winding W3 coupled to the low-voltage-side winding W2, generate an induced current. The induced current is rectified by the diode D3 and the capacitor C4, passes through the diode D2, and is supplied to the power-supply inputting port VIN of the regulating chip U1, to serve as the operating current of the regulating chip U1. Accordingly, after the regulating chip U1 has started to operate, the regulating chip U1 is provided with a stable power-supply input, which guarantees the stable power supplying of the controlling chip U1.

Therefore, in the electric-power supplying device according to the first embodiment, when the low-voltage power supplying of the controller is normal, the main output of the electric-power supplying device is not operating, and is not adding the load of the low-voltage power supply. Simultaneously, the electric-power supplying device will be in the state of a low power consumption. Merely when the controlling output enabling signal is given, the main output loop of the electric-power supplying device is turned on. At this point, the regulating chip U1 can be provided with a stable power-supply input without separately providing an input power supply, and a stable power supplying to the regulating chip can be guaranteed and the structure of the electric-power supplying device is more compact.

The Second Embodiment

Figure 2:
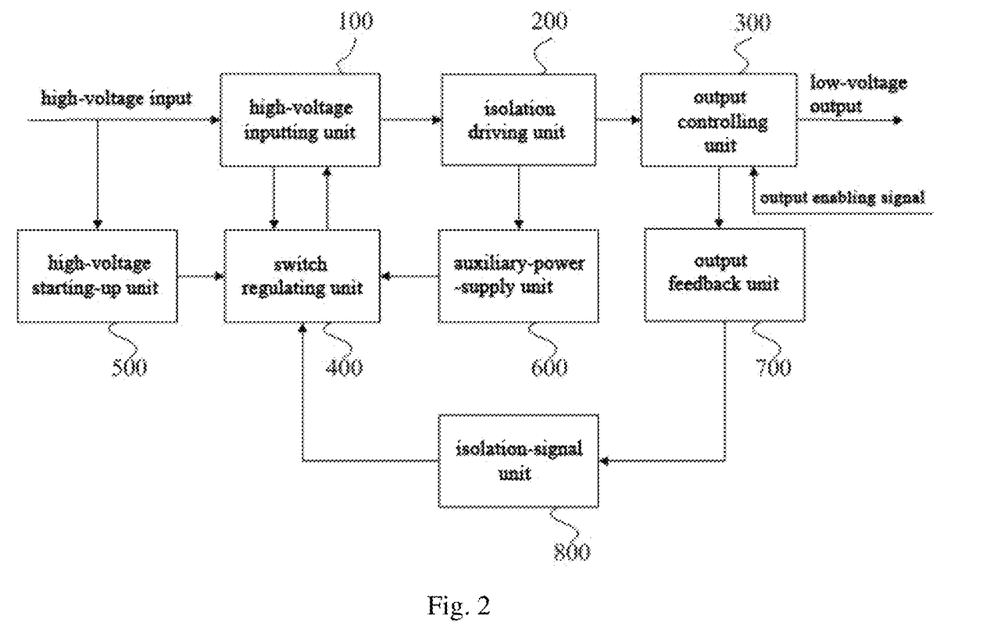
FIG. 2 is a schematic block diagram illustrating the second embodiment of the present disclosure.

FIG. 2 is a schematic block diagram illustrating the second embodiment of the present disclosure. The second embodiment is described by referring to FIGS. 2 and 3.

The second embodiment differs from the first embodiment in that the electric-power supplying device is further provided with an output feedback unit 700 and an isolation-signal unit 800, the switch regulating unit 400 is further provided with resistors R6, R17 and a capacitor C8, and the regulating chip U1 further has a feedback-signal inputting port FB. The elements of the second embodiment that are the same as those of the first embodiment are marked with the same reference numbers, and the descriptions on them are omitted.

The isolation-signal unit 800 comprises an optical coupler U2, and the optical coupler U2 comprises a light emitting part and a light receiving part that are coupled.

The output feedback unit 700 has resistors R7, R9, R14-R16, R18, a capacitor C7 and a regulator U3. As shown in FIG. 3, the regulator U3 is a three-terminal shunting regulator, and is connected to the output controlling unit 300 via the resistors R7, R9, R15, R16, R18. The first terminal of the regulator U3 is connected to the resistor R7 via the current regulating resistor R9, the second terminal is connected to the divider resistor R15, R18 via the current limiting resistor R16, and the third terminal is connected to the low-voltage-side reference ground. One end of the resistor R7 is connected to the anode of the diode D6, and the other end is connected to the light emitting part of the optical coupler U2, to serve as the input of the optical coupler.

The resistors R6, R17 and the capacitor C8 form a feedback loop. The feedback loop receives the electric signal from the light receiving part of the optical coupler U2, and transmits the electric signal to the feedback-signal inputting port FB of the regulating chip U1.

The operation process and the effects of the electric-power supplying device that is specific in the second embodiment are described below.

The high-voltage inputting unit 100, the isolation driving unit 200, the output controlling unit 300, the high-voltage starting-up unit 500 and the auxiliary-power-supply unit 600 are the same as those of the first embodiment, and are omitted here.

When the main output loop of the electric-power supplying device is turned on, the low-voltage output $L_{out}$ provides a reference voltage to the second terminal of the regulator U3 via the divider resistors R15, R18. When the low-voltage output $L_{out}$ changes, the reference voltage changes, and the electric currents that can pass through the first terminal and the third terminal of the regulator U3 will correspondingly change. At this point, the electric current that passes through the input end of the optical coupler will change.

The light emitting part of the optical coupler converts an electric signal that reflects the change in the electric current of the input end of the optical coupler into a light signal and emits the light signal. The light receiving part receives the light signal emitted by the light emitting part, and converts it into an electric signal, as the outputted feedback signal, thereby transmitting, in the circuit where high voltage is isolated from low voltage, in the manner of electric isolation, the electric signal at the low-voltage side to the high-voltage side.

The outputted feedback signal is transmitted to the feedback-signal inputting port FB of the regulating chip U1 via the feedback loop, which enables the power supply to be closed-loop controlled, to enable the power-supply output to be more stable and more reliable.

The above descriptions are merely preferable embodiments of the present disclosure, and are not limiting the protection scope of the present disclosure. Any modifications, equivalent substitutions and improvements that are made within the spirit and principle of the present disclosure should fall within the protection scope of the present disclosure.

What is claimed is:

1. An electric-power supplying device, wherein the electric-power supplying device comprises:
    an isolation driving unit, comprising a high-voltage-side winding and a low-voltage-side winding, configured to transform a high-voltage input from a high-voltage power supply into a low-voltage output;
    a high-voltage inputting unit, comprising a first switch part that is connected in series to the high-voltage-side winding of the isolation driving unit;
    an output controlling unit, comprising a first terminal that is connected to the low-voltage-side winding of the isolation driving unit, a second terminal for receiving an output enabling signal from external, and a third terminal for outputting a low-voltage power-supply electric power when the output enabling signal is high;
    a switch regulating unit, configured to output a switch regulating signal to the first switch part of the high-voltage inputting unit;
    a high-voltage starting-up unit, comprising a first end that is connected to the high-voltage power supply, and a second end that is connected to the switch regulating unit, configured to supply a starting-up voltage to the switch regulating unit; and
    an auxiliary-power-supply unit, comprising a first end that is connected to an auxiliary power supplying winding of the isolation driving unit that is coupled to the low-voltage-side winding, and a second end that is connected to the switch regulating unit, configured to supply an electric power to the switch regulating unit, wherein
    the auxiliary-power-supply unit comprises: an auxiliary filtering part, comprising a fourth diode and a second capacitor, configured to filter an auxiliary power supply that is outputted from the auxiliary power supplying winding of the isolation driving unit; and a fifth diode, comprising an anode that is connected to an output end of the auxiliary filtering part, and a cathode that is connected to the switch regulating unit, and
    the high-voltage starting-up unit comprises: a third switch part, comprising a source that is connected to the high-voltage power supply via a fourth resistor, a grid that is connected to the high-voltage power supply via a fifth resistor, and a drain that is connected to the switch regulating unit; a first voltage stabilizing part, comprising a cathode that is connected to the grid of the third switch part, and an anode that is connected to a high-voltage-side reference ground; and a charging element, connected to the switch regulating unit at one end, and connected to the anode of the first voltage stabilizing part at the other end.

2. The electric-power supplying device according to claim 1, wherein the high-voltage inputting unit further comprises:
    an absorbing loop, connected in parallel to the high-voltage-side winding of the isolation driving unit; and
    a sampling element, connected to the switch regulating unit, configured to output a sampled signal; and
    the switch regulating unit is configured to, based on the sampled signal from the sampling element, output the switch regulating signal to the high-voltage inputting unit.

3. The electric-power supplying device according to claim 2, wherein
    the absorbing loop comprises a first resistor, a first capacitor and a first diode, and the first resistor is connected in parallel to the first capacitor, and is connected to a cathode of the first diode;
    the first switch part comprises a first MOS transistor, and the first MOS transistor has a source that is connected to the high-voltage-side winding of the isolation driving unit, and a grid that is connected to the switch regulating unit, and is configured to receive the switch regulating signal from the switch regulating unit; and
    the sampling element comprises a second resistor, and the second resistor is connected to a drain of the first MOS transistor at one end, and connected to a high-voltage-side reference ground at the other end.

4. The electric-power supplying device according to claim 1, wherein
    the output controlling unit comprises:
    an output filtering part, connected to the low-voltage-side winding of the isolation driving unit; an outputting part, connected to an output end of the output filtering part, configured to output a low-voltage electric power via a second switch part; and an output-enabling controlling part, configured to, when the output enabling signal is high, cause the second switch part of the outputting part to turn on.

5. The electric-power supplying device according to claim 4, wherein
    the outputting part of the output controlling unit further comprises: a second diode, comprising an anode that is connected to the output end of the output filtering part, and a cathode that is connected to a source of the second switch part; and a third diode and a third resistor, connected in parallel between the source and a grid of the second switch part, a cathode of the third diode being connected to the source of the second switch part; and
    the output-enabling controlling part comprises a third switch part, and the third switch part has a grid that is connected to an enabling-signal inputting terminal, a source that is connected to the grid of the second switch part, and a drain that is connected to a low-voltage-side reference ground.

6. The electric-power supplying device according to claim 1, wherein
    the electric-power supplying device further comprises: an isolation-signal unit, comprising a light emitting part and a light receiving part that are coupled; and
    an output feedback unit, comprising a first end that is connected to the output controlling unit, and a second end that is connected to the light emitting part, configured to cause the light emitting part to emit light corresponding to an output level of the output controlling unit; and the light receiving part is connected to the switch regulating unit, and is configured to convert a received light signal into an electric signal and provide the electric signal to the switch regulating unit.

7. The electric-power supplying device according to claim 6, wherein
the output feedback unit comprises: a voltage dividing part, connected to an output end of an output filtering part of the output controlling unit, configured to divide an output voltage of the output filtering part; a second voltage stabilizing part, configured to use an output voltage of the voltage dividing part as a reference voltage; and a voltage regulating part, configured to regulate a cathode voltage of the second voltage stabilizing part.

8. The electric-power supplying device according to claim 6, wherein
the switch regulating unit comprises:
a regulating part, comprising: a power-supply inputting port, configured to receive a starting-up voltage and an operating electric power that are supplied to the regulating part; a sampling-signal inputting port, configured to receive a sampled signal from the high-voltage inputting unit; a switch-regulating-signal outputting port, configured to output a switch regulating signal to the high-voltage inputting unit; a feedback-signal inputting port, configured to receive a feedback signal from the light receiving part of the isolation-signal unit; and a switch-frequency configuring port and a compensation controlling port;
a switch-frequency configuring part, connected to the switch-frequency configuring port at one end, and connected to a high-voltage-side reference ground at the other end; and
a compensation controlling part, connected to the compensation controlling port at one end, and connected to the high-voltage-side reference ground at the other end, configured to perform compensation control on the switch regulating unit; and
the light receiving part of the isolation-signal unit is connected to the feedback-signal inputting port of the switch regulating unit.

9. The electric-power supplying device according to claim 3, wherein
the high-voltage-side reference ground is a high-voltage inputting cathode of the high-voltage power supply, and a low-voltage-side reference ground is a low-voltage outputting cathode of a low-voltage outputting end.

10. A standby power supply of a vehicle controller, wherein
the standby power supply comprises the electric-power supplying device according to claim 1, and
a controlling end, configured to output the output enabling signal to the electric-power supplying device to guarantee normal power supplying to the vehicle controller.

11. The electric-power supplying device according to claim 1, wherein
the high-voltage-side reference ground is a high-voltage inputting cathode of the high-voltage power supply, and a low-voltage-side reference ground is a low-voltage outputting cathode of a low-voltage outputting end.

12. The electric-power supplying device according to claim 8, wherein
the high-voltage-side reference ground is a high-voltage inputting cathode of the high-voltage power supply, and a low-voltage-side reference ground is a low-voltage outputting cathode of a low-voltage outputting end.

13. A standby power supply of a vehicle controller, wherein
the standby power supply comprises the electric-power supplying device according to claim 2, and
a controlling end, configured to output the output enabling signal to the electric-power supplying device to guarantee normal power supplying to the vehicle controller.

14. A standby power supply of a vehicle controller, wherein
the standby power supply comprises the electric-power supplying device according to claim 4, and
a controlling end, configured to output the output enabling signal to the electric-power supplying device to guarantee normal power supplying to the vehicle controller.

15. A standby power supply of a vehicle controller, wherein
the standby power supply comprises the electric-power supplying device according to claim 6, and
a controlling end, configured to output the output enabling signal to the electric-power supplying device to guarantee normal power supplying to the vehicle controller.

* * * * *